United States Patent [19]

Inata et al.

[11] 3,928,279

[45] Dec. 23, 1975

[54] GLASS FIBER-CONTAINING AROMATIC POLYESTER COMPOSITION

[75] Inventors: Hiroo Inata; Shoji Kawase; Takeo Shima, all of Iwakuni, Japan

[73] Assignee: Teijin Limited, Osaka, Japan

[22] Filed: Mar. 22, 1974

[21] Appl. No.: 454,006

[30] Foreign Application Priority Data
Mar. 26, 1973 Japan............................. 48-34879

[52] U.S. Cl........................ 260/40 R; 260/45.85 S
[51] Int. Cl.$^2$...................... C08K 3/40; C08K 5/38
[58] Field of Search................... 260/40 R, 45.85 S

[56] References Cited
UNITED STATES PATENTS

| | | | |
|---|---|---|---|
| 3,157,619 | 11/1964 | Bell et al. | 260/45.85 S |
| 3,243,413 | 3/1966 | Bell et al. | 260/45.85 S |
| 3,671,487 | 6/1972 | Abalins | 260/40 R |
| 3,814,725 | 6/1974 | Zimmerman et al. | 260/40 R |

*Primary Examiner*—Donald E. Czaja
*Assistant Examiner*—S. M. Person
*Attorney, Agent, or Firm*—Sherman & Shalloway

[57] ABSTRACT

An aromatic polyester composition containing glass fibers, comprising 100 parts by weight of an aromatic polyester resin selected from the group consisting of poly(alkylene terephthalate) resin and poly(alkylene naphthalate) resin and 3 to 70 parts by weight of glass fibers, said composition further including 0.01 to 5 parts by weight, per 100 parts by weight, of a thiodipropionic acid diester.

9 Claims, No Drawings

GLASS FIBER-CONTAINING AROMATIC POLYESTER COMPOSITION

This invention relates to an aromatic polyester composition containing glass fibers which will not heat deteriorate because of the incorporation of the glass fibers. More specifically, this invention relates to an aromatic polyester composition containing glass fibers, comprising 100 parts by weight of an aromatic polyester selected from the group consisting of poly(alkylene terephthalate) resins and poly(alkylene naphthalate) resins and 3 to 70 parts by weight of glass fibers, such composition further including 0.01 to 5 parts by weight, per 100 parts by weight, of a thiodipropionic acid ester.

Aromatic polyester resins reinforced with glass fibers have a wide range of utility because of their improved mechanical properties such as impact strength or properties at high temperatures as compared with aromatic polyester resins not reinforced with the glass fibers. The surfaces of the glass fibers used for reinforcing contain auxiliary agents such as a bundling agent or an adhesive applied thereto, and this serves to increase the bond strength of the glass fibers to the resins and contributes to an improvement in the mechanical properties of the reinforced composition.

We have found that the properties at high temperatures of an aromatic polyester composition reinforced with glass fibers are indeed improved as compared with the nonreinforced aromatic polyester composition, but that the presence of auxiliary agents such as a bundling agent or an adhesive which serves for the firm bonding of the glass fibers to the aromatic polyester resin, on the other hand, restricts the improvement of the properties of the reinforced resin when melting the aromatic polyester resin and adding the glass fibers, or melting the aromatic polyester resin to which has been added the glass fibers. Specifically, we have found that the auxiliary agents applied to the surfaces of the reinforcing glass fibers, for example, a surface treating agent such as a silane compound (e.g., vinyl silane or amino silane), or an epoxysilane compound, a bundling agent such as poly(vinyl acetate), a polyester, or a polyurethane compound act on the aromatic polyester resin to facilitate the deterioration of the resin, and consequently, they adversely act on the improvement of the properties of the resin by the glass fibers.

Our further investigation in an attempt to overcome this difficulty has led to the discovery that the incorporation of a small amount of a thiodipropionic acid diester to the composition inhibits the adverse action of the auxiliary agents and can lead to a greater improvement of the properties of the reinforced aromatic polyester composition.

It was previously known (Japanese Patent Publication No. 4995/67 that poly(ethylene terephthalate) having improved transparency and inhibited coloration can be obtained by performing the polymerization in the presence of a dialkyl thiodipropionate, such as dilauryl thiodipropionate. This Japanese Patent Publication discloses that the dialkyl thiodipropionate give favorable results only when added during the polymerization. The Patent does not at all describe the reinforcement of the resulting poly(ethylene terephthalate) with glass fibers, let alone the presence of the above-described defect of the glass fiber-reinforced resin.

We have now found that this defect can be advantageously remedied by incorporating the thiodipropionic acid diester, which must be added during polymerization in the above prior technique, to an aromatic polyester resin preferably after the end of polymerization. It has also been found that when the aromatic polyester resin is a poly (alkylene terephthalate) other than poly(ethylene terephthalate), or a poly(alkylene naphthalate) resin, coloration or other disadvantages do not occur even if the thiodipropionic acid diester is incorporated into the reaction system at a time ranging from the initiation of the reaction for forming the polymer to the end of the polymerization reaction.

Accordingly, it is an object of this invention to provide an aromatic polyester composition reinforced with glass fibers which have improved properties, and are prevented from heat deterioration to be caused by the incorporation of the glass fibers.

Other objects of this invention along with its advantages will become apparent from the following description.

The aromatic polyester resin used in this invention is one selected from the group consisting of poly(alkylene terephthalate) resins and poly(alkylene naphthalate) resins. The term "aromatic polyester resin", as used in the present specification and appended claims, denote these polymers containing at least 50% by weight, preferably at least 60% by weight, and more preferably at least 80% by weight, of alkylene terephthalate units or alkylene naphthalate units.

Examples of an aromatic dicarboxylic acid component used for forming the aromatic polyester resin are terephthalic acid, polyester-forming derivatives of terephthalic acid, naphthalenedicarboxylic acids, and polyester-forming derivatives thereof. Specific examples include terephthalic acid, 2,6-naphthalenedicarboxylic acid, 2,7-naphthalenedicarboxylic acid, 1,5-naphthalenedicarboxylic acid, and polyester-forming derivatives thereof, such as $C_{1-3}$ alkyl esters.

A minor amount of another acid component may be used in preparing the aromatic polyester resin. Examples of the other acid component are dicarboxylic acids, such as isophthalic acid, terephthalic acid (where the main acid component is naphthalenedicarboxylic acid), naphthalenedicarboxylic acid (when the main acid component is terephthalic acid), diphenyldicarboxylic acid, diphenoxyethanedicarboxylic acid, and p-hydroxybenzoic acid, and polyester-forming derivatives thereof, such as $C_1$-$C_3$ lower alkyl esters thereof.

Examples of a glycol component used for preparing the aromatic polyester resin are ethylene glycol, trimethylene glycol, tetramethylene glycol, pentamethylene glycol, hexamethylene glycol, decamethylene glycol, neopentylene glycol, or cyclohexanedimethanol.

These acid components and glycol components may be used alone or in admixture of 2 or more.

The method for producing the aromatic polyester resin is known per se. For example, an alkyl ester of a dicarboxylic acid is reacted with a glycol in the presence of an ester-interchange catalyst by heating, and polycondensing the resulting glycol ester in the presence of a polycondensation catalyst by heating.

Thus, specific examples of the aromatic polyester resins include poly(ethylene terephthalate) resin, poly(trimethylene terephthalate) resin, poly(tetramethylene terephthalate) resin, poly(hexamethylene terephthalate) resin, poly(ethylene naphthalate) resin, poly(trimethylene naphthalate) resin, poly(tetramethylene naphthalate) resin, and poly(hexamethylene naphthalate) resin. Of these, the poly (tetramethylene terephthalate) resin, poly(tetramethylene naphthalate) resin, poly(hexamethylene terephthalate) resin, and poly(hexamethylene naphthalate) resin are preferred.

Any kind of glass fibers usually used for reinforcing thermoplastic resin can be used in the present invention. These glass fibers to be added to the aromatic polyester resin may be in the form of filaments or cut staples. The amount of the glass fibers is 3 to 70 parts by weight, preferably 7 to 50 parts by weight, per 100 parts by weight of the aromatic polyester resin.

The composition of this invention further contains a thiodipropionic acid diester in addition to 100 parts by weight of an aromatic polyester resin selected from the group consisting of poly(alkylene terephthalate) resins and poly(alkylene naphthalate) resins and 3 to 70 parts by weight of glass fibers. The thiodipropionic acid diester may, for example, be $C_1$–$C_{20}$ alkyl diesters, preferably $C_5$–$C_{20}$ alkyl diesters, of thiodipropionic acid, or $C_6$–$C_{12}$ aryl diesters of thiodipropionic acid. In the case of the aryl esters, the aryl group may contain a substituent, for example, an alkyl group containing 1 to 3 carbon atoms, such as methyl, ethyl, n-propyl, or isopropyl.

Specific examples of the thiodipropionate are dimethyl thiodipropionate, diethyl thiodipropionate, di-n-propyl thiodipropionate, di-n-butyl thiodipropionate, di-sec.-butyl thiodipropionate, di-t-butyl thiodipropionate, di-n-hexyl thiodipropionate, dioctyl thiodipropionate, didecyl thiodipropionate, dilauryl thiodipropionate, dimyristyl thiodipropionate, dicetyl thiodipropionate, distearyl thiodipropionate, diphenyl thiodipropionate, dibenzyl thiodipropionate, ditolyl thiodipropionate, and dinaphthyl thiodipropionate.

The thiodipropionic acid diester is used in an amount of about 0.01 to about 5 parts by weight, preferably about 0.05 to about 3 parts by weight, based on 100 parts by weight of the aromatic polyester resin. If the amount is less than the lower limit of the above-specified range, it is difficult to obtain the desired effect. On the other hand, even when it is used in an amount exceeding the upper limit, no appreciable increase in the effect can be achieved. Accordingly, the thiodipropionic acid diester should be used in the specified amount.

Furthermore, in the present invention, a polyester obtained by reacting an acid component, a part or whole of which is composed of the thiopropionic acid or its ester-forming derivative, with a glycol can also be used as the thiodipropionate described above. In this case the amount should be so specified that the amount of the recurring units containing the thiodipropionic acid as an acid component is 0.01 to 5 parts by weight, preferably 0.05 to 3 parts by weight, per 100 parts by weight of the aromatic polyester resin.

It is preferred that the thiodipropionic acid diester should be incorporated at a desired time after the end of the polymerization forming the aromatic polyester resin and before the melt-shaping of the resulting composition. However, when the aromatic polyester resin is a poly(alkylene terephthalate) other than poly(ethylene terephthalate) or a poly(alkylene naphthalate) resin, the thiodipropionic acid ester can be incorporated in the reaction system before the end of the polymerization forming the polyester resin. For example, it may be added to a raw material for preparing the aromatic polyester resin, or may be added to the intermediate product during the formation of the aromatic polyester.

The composition of this invention can be in any form such as granules, flakes, or pellets which are inclusively termed "pellets for melt-shaping" in the present specification. Or it may be in the form of a final article formed by melt-shaping such pellets.

The composition of this invention can further contain a coloring agent such as a pigment, a fluorescent bleaching agent, a fire retardant, a crystallization promoter, or other conventional additives. The amount of such additives is usually not more than about 5% by weight based on the weight of the composition.

The following Examples and Comparative Examples illustrate the present invention more specifically. In these examples, all parts are by weight, and the intrinsic viscosity values [$\eta$] were determined at 35°C. on an orthochlorophenol solution of the sample. The tensile strength was measured in accordance with ASTM 638.

EXAMPLE 1 AND COMPARATIVE EXAMPLES 1 to 3

70 Parts of poly(tetramethylene terephthalate) having an intrinsic viscosity of 1.15, 30 parts of glass fibers having a fiber length of about 7 mm and surface treated with an agent containing polyvinyl acetate, and 0.35 part of dilauryl thiodipropionate were melt-mixed at 260°C. and extruded using an extruder (30 m/m $\phi$). The intrinsic viscosity of the polytetramethylene terephthalate portion of the pellets was 1.11. The pellets had a tensile strength of 1230 Kg/cm², and after being maintained for 3 days in hot air at 200°C., exhibited a tensile strength retention of 98%.

For comparison, the above procedure was repeated without using the dilauryl thiodipropionate (Comparative Example 1). Furthermore, the above procedure was repeated except that the dilauryl thiodipropionate was not used, and the glass fibers were extracted with chloroform and acetone under reflux for 3 hours each (Comparative Example 2). Furthermore, the above procedure was repeated except that the glass fibers were extracted under reflux with chloroform and acetone for 3 hours each to remove the polyvinyl acetate-containing agent applied thereto (Comparative Example 3). The intrinsic viscosity of the poly(tetramethylene terephthalate) portion of the resulting pellets, the tensile strength of the pellets, and the retention of the tensile strength after standing for 3 days in air held at 200°C. are shown in Table 1.

Table 1

| | Thiodi-propionic acid diester | Properties of pellets | | |
| --- | --- | --- | --- | --- |
| | | [$\eta$] | Tensile strength (Kg/cm²) | Retention of tensile strength (%) |
| Example 1 | Dilauryl thiodipropionate | 1.11 | 1230 | 98 |
| Comparative Example 1 | not added | 0.92 | 1010 | 73 |
| Comparative Example 2 | not added | 0.98 | 1020 | 75 |
| Comparative Example 3 | Dilauryl thiodipropionate | 1.11 | 1040 | 98 |

EXAMPLES 2 TO 8 AND COMPARATIVE EXAMPLES 4 AND 5

Each of the aromatic polyester resins shown in Table 2, the same glass fibers are used in Example 1, and each of the thiodipropionic acid diesters shown in Table 2 were used in the amounts indicated in Table 2, and melt-mixed and extruded at 260°C. using an extruder (30 m/m $\phi$). The retention of [$\eta$] of the resin portion of the resulting pellets, and the retention of the tensile strength of the pellets after standing for 3 days in air at 200°C. are shown in Table 2.

Table 2

| Examples and Comparative Examples | Aromatic polyester resins Type | [$\eta$] | Amount (parts) | Amount of the glass fibers (parts) | Thiodipropionic acid diester Type | Amount (parts) | Properties of the pellets [$\eta$] retention (%) | Retention of tensile strength (%) |
|---|---|---|---|---|---|---|---|---|
| Example 2 | Poly(tetramethylene terephthalate) | 0.85 | 70 | 30 | Dimyristyl thiodipropionate | 1.0 | 99 | 98 |
| Example 3 | Poly(tetramethylene-2,6-naphthalate) | 0.92 | 70 | 30 | Dilauryl thiodipropionate | 0.5 | 99 | 99 |
| Comparative Example 4 | Ditto | 0.92 | 70 | 30 | Not added | — | 92 | 77 |
| Example 4 | (Poly(tetramethylene) terephthalate) | 0.92 | 80 | 20 | Diphenyl thiodipropionate | 0.7 | 99 | 98 |
| Example 5 | Ditto | 0.92 | 80 | 20 | Diethyl thiodipropionate | 0.4 | 98 | 98 |
| Example 6 | Poly(hexamethylene terephthalate) | 0.85 | 70 | 30 | Dilauryl thiodipropionate | 0.5 | 99 | |
| Example 7 | Poly(hexamethylene 2,6-naphthalate) | 0.82 | 70 | 30 | Dimyristyl thiodipropionate | 0.5 | 99 | 99 |
| Example 8 | Ditto | 0.82 | 80 | 20 | Ditto | 0.3 | 99 | 98 |
| Comparative Example 5 | Ditto | 0.82 | 80 | 20 | Not added | — | 91 | 72 |

From the above tables, the marked stabilizing effect of the thiodipropionic acid diesters can be appreciated.

What we claim is:

1. An aromatic polyester composition containing glass fibers, comprising 100 parts by weight of an aromatic polyester resin selected from the group consisting of poly(alkylene terephthalate) resins containing at least 80% by weight of alkylene terephthalate units and poly(alkylene naphthalate) resins containing at least 80% by weight of alkylene naphthalate units, 3 to 70 parts by weight of glass fibers and a stabilizer to protect against heat deterioration consisting essentially of 0.01 to 5 parts by weight, per 100 parts by weight of said aromatic polyester resin, of a thiodipropionic acid diester.

2. The composition of claim 1 wherein said thiodipropionic acid diester is selected from the group consisting of $C_1$–$C_{20}$ alkyl esters of thiodipropionic acid and $C_6$–$C_{12}$ aryl esters of thiodipropionic acid.

3. The composition of claim 1 wherein said aromatic polyester resin is selected from the group consisting of poly(trimethylene terephthalate), poly(tetramethylene terephthalate), poly(hexamethylene terephthalate), poly(ethylene naphthalate), poly(trimethylene naphthalate), poly(tetramethylene naphthalate), and poly(hexamethylene naphthalate) resins.

4. The composition of claim 1 wherein said thiodipropionic acid diester is incorporated in said composition at any time after the completion of the polymerization for preparing aromatic polyester resin, and before the meltshaping of the said composition.

5. The composition of claim 1 wherein said aromatic polyester resin is selected from the group consisting of poly(alkylene terephthalate) resins other than poly(ethylene terephthalate) resin, and poly(alkylene naphthalate) resins, and said thiodipropionic acid diester is incorporated in the reaction system before the end of the polymerization for forming the resin.

6. The composition of claim 1 which is in the form of a pellet for melt-shaping.

7. The composition of claim 1 which is in the form of a melt-shaped article.

8. A process for producing an aromatic polyester composition stable against heat deterioration which comprises incorporating 3 to 70 parts by weight of glass fibers and 0.01 to 5 parts by weight of a thiodipropionic acid diester in 100 parts by weight of an aromatic polyester resin selected from the group consisting of poly(alkylene terephthalate) resins and poly(alkylene naphthalate) resins containing at least 80% by weight of alkylene terephthalate units or alkylene naphthalate units respectively, wherein said diester is incorporated in said composition at a time after the completion of the polymerization for preparing said resin, and before the melt-shaping of said composition.

9. A process for producing an aromatic polyester composition stable against heat deterioration which comprises incorporating 3 to 70 parts by weight of glass fibers and 0.01 to 5 parts by weight of thiodipropionic acid diester in 100 parts by weight of an aromatic polyester resin selected from the group consisting of poly(alkylene terephthalate) resins other than poly(ethylene terephthalate) resins and poly (alkylene naphthalate) resins containing at least 80% by weight of alkylene terephthalate units or alkylene naphthalate units respectively, wherein said diester is added to the polymerization reaction system for forming said aromatic polyester resin before the end of the polymerization reaction.

* * * * *